April 21, 1925.  W. E. POSEY  1,534,541
SAW GAUGE
Filed Feb. 9, 1924
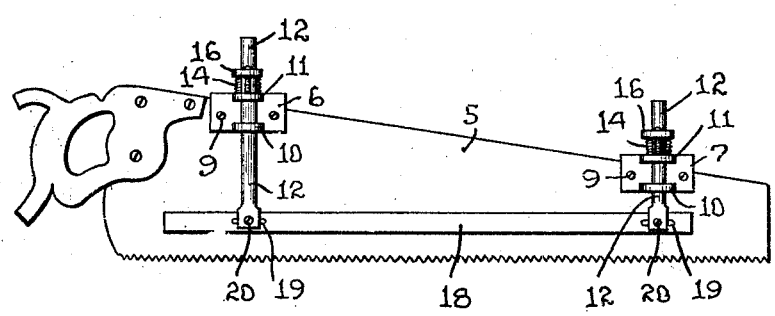
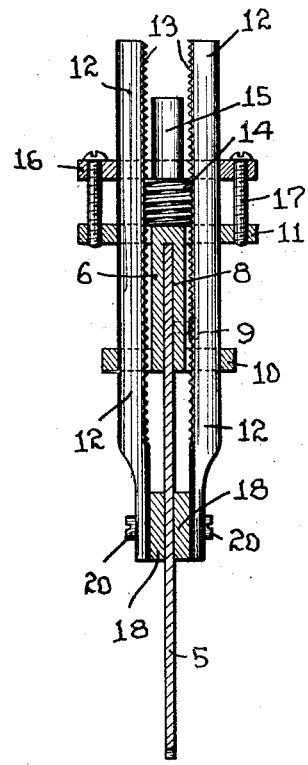
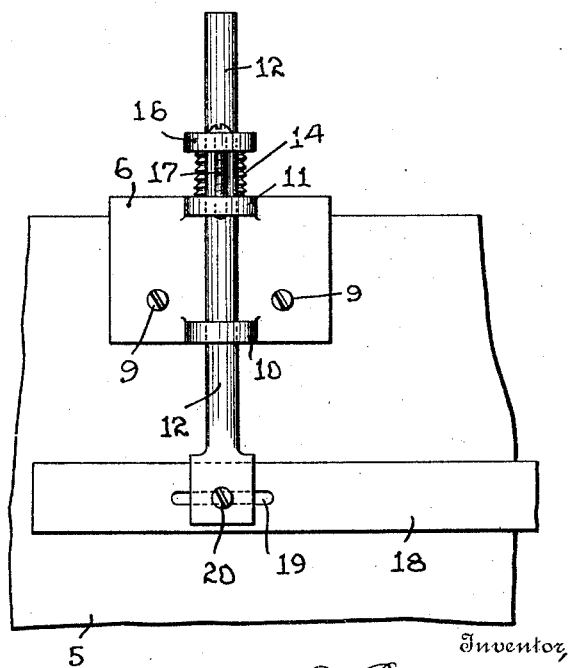

Patented Apr. 21, 1925.

1,534,541

UNITED STATES PATENT OFFICE.

WILLIE E. POSEY, OF WACO, TEXAS.

SAW GAUGE.

Application filed February 9, 1924. Serial No. 691,752.

*To all whom it may concern:*

Be it known that I, WILLIE E. POSEY, a citizen of the United States of America, and resident of Waco, in the county of McLennan and State of Texas, have invented certain new and useful Improvements in Saw Gauges, of which the following is a specification.

This invention relates to saw gauges, and particularly to a device adapted to be secured to a saw for the purpose of regulating the depth of cut of the saw, and for maintaining uniformity in the production of grooves or the like. Specifically, the invention consists in an attachment preferably for hand saws in order that the depth of cut may be determined through the employment of a clamp having operating means by which the gauge is regulated.

The invention has been found of special advantage in producing rabbets in the manufacture of doors and window frames and also in cutting material for stairways.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1 illustrates a view in elevation of a saw showing a device embodying the invention applied thereto;

Figure 2 illlustrates a sectional view through a saddle and parts associated with it; and Figure 3 illustrates an enlarged detail view of a fragment of the gauge associated with a fragment of a saw.

In these drawings, 5 denotes a hand saw to which a device embodying the invention is applied, through the employment of saddles 6 and 7. As the parts associated with the saddles are of identical construction, a description of one of them will suffice for an understanding of the invention by one skilled in the art.

Each saddle has a slot 8 for the reception of the saw and the saddle may be secured in place by set screws such as 9. Each saddle has guides on its sides and the guides, in the present embodiment of the invention, are formed by flanges 10 and 11 at the lower and upper edges of the saddles respectively, the said flanges being apertured to receive the guide rods 12, one of which operates on each side of a saddle. The said guide rods are provided with threads or teeth 13 on their inner surfaces and these teeth are engaged by a worm or screw 14, the turning of which causes the guide rods to be elevated or lowered, according to the direction of rotation of the screw. Each screw has a stem 15 projecting upwardly through a guide plate 16 that is apertured to receive the guide rods and the said stem. The guide plate serves to retain the screw in engagement with the threads of the guide rods and it is held in place in associated relation to the flange 11 by fastenings 17 such as screws, so that that saddle and the parts associated with it will be held firmly on the saw.

A gauge or straight edge 18 is applied to each side of the saw blade and preferably this member 18 is provided with slots 19 near its ends to receive a pin or connection 20 that extends through a guide rod near its lower end so that the member 18 is connected to the guide rods on one side of the saw. The guide rods on the two sides of the saw will, however, operate in unison projecting or receiving, according to the direction of rotation of the screw. The length of the gauge 18 may be varied to suit particular requirements and in some instances, it will be found more desirable to have the gauge 18 the full length of the saw proper.

From an inspection of the drawing and from the foregoing description, it will be apparent that an operator may change the position of the members 18 with relation to the cutting edge of the saw and that the parts will be held at the different positions of adjustment.

I claim:

1. In a gauge for saws, saddles adapted to be secured to the said saw, guide rods having threads, means on the saddles in which the guide rods are slidable, a screw rotatably mounted on each saddle for engaging the threads of the said guide rods, means for preventing displacement of the screws, gauges having slots and elements extending through the slots for connecting the said gauges to the guide rods.

2. In a gauge for saws, saddles adapted to be secured on the backs of saws, guides projecting from the sides of the saddles, guide rods in the said guides, the said guide rods having threads, a screw for engaging the threads of each pair of guide rods, and a gauge connected to the guide rods on each side of the saw.

WILLIE E. POSEY.